(12) United States Patent
Miller

(10) Patent No.: US 7,536,457 B2
(45) Date of Patent: May 19, 2009

(54) SYSTEM AND METHOD FOR WIRELESS DELIVERY OF EVENT DATA

(75) Inventor: Carl Miller, Encinitas, CA (US)

(73) Assignee: Drivecam, Inc., San Diego, CA (US)

( * ) Notice: Subject to any disclaimer, the term of this patent is extended or adjusted under 35 U.S.C. 154(b) by 0 days.

(21) Appl. No.: 11/566,526

(22) Filed: Dec. 4, 2006

(65) Prior Publication Data

US 2007/0260363 A1    Nov. 8, 2007

Related U.S. Application Data

(63) Continuation-in-part of application No. 11/382,328, filed on May 9, 2006, and a continuation-in-part of application No. 11/382,325, filed on May 9, 2006, and a continuation-in-part of application No. 11/382,222, filed on May 8, 2006, and a continuation-in-part of application No. 11/382,239, filed on May 8, 2006.

(51) Int. Cl.
G06F 13/00 (2006.01)

(52) U.S. Cl. .................. 709/224; 709/219; 709/229; 719/318

(58) Field of Classification Search .............. 709/217, 709/219, 227, 228, 250, 223, 224, 229; 455/452.1; 719/318
See application file for complete search history.

(56) References Cited

U.S. PATENT DOCUMENTS

| | | | |
|---|---|---|---|
| 2,943,141 A | 6/1960 | Knight | |
| 3,781,824 A | 12/1973 | Caiti et al. | |
| 3,812,287 A | 5/1974 | Lemelson | |
| 3,885,090 A | 5/1975 | Rosenbaum | |
| 3,992,656 A | 11/1976 | Joy | |
| 4,054,752 A | 10/1977 | Dennis, Jr. et al. | |
| 4,271,358 A | 6/1981 | Schwarz | |

(Continued)

FOREIGN PATENT DOCUMENTS

GB    2 268 608    1/1994

(Continued)

OTHER PUBLICATIONS

US Receiving Office, International Search Report, Oct. 15, 2007.

(Continued)

*Primary Examiner*—Viet Vu
(74) *Attorney, Agent, or Firm*—Steins & Associates, P.C.

(57) ABSTRACT

Driving events are captured at an event detector in a vehicle and stored in an associated data storage area. The output of a sensor in the vehicle is monitored, and the stored driving event data is sent to an evaluation server over a wireless communication network when a data transfer condition is detected. Driving event data is sent to the evaluation server when a predetermined output from the sensor is detected and the vehicle is in the transmission range of an access point. The predetermined sensor output may be from a motion sensor in the vehicle indicating that the vehicle is substantially stopped, or from a vehicle location sensor indicating that the vehicle is within transmission range of an access point.

28 Claims, 9 Drawing Sheets

U.S. PATENT DOCUMENTS

| | | |
|---|---|---|
| 4,280,151 A | 7/1981 | Tsunekawa et al. |
| 4,281,354 A | 7/1981 | Conte |
| 4,401,976 A | 8/1983 | Stadelmayr |
| 4,409,670 A | 10/1983 | Herndon et al. |
| 4,420,773 A | 12/1983 | Toyoda et al. |
| 4,456,931 A | 6/1984 | Toyoda et al. |
| 4,489,351 A | 12/1984 | d'Alayer de Costemore d'Arc |
| 4,496,995 A | 1/1985 | Colles et al. |
| 4,533,962 A | 8/1985 | Decker et al. |
| 4,558,379 A | 12/1985 | Hutter et al. |
| 4,593,313 A | 6/1986 | Nagasaki et al. |
| 4,621,335 A | 11/1986 | Bluish et al. |
| 4,625,210 A | 11/1986 | Sagl |
| 4,630,110 A | 12/1986 | Cotton et al. |
| 4,632,348 A | 12/1986 | Keesling et al. |
| 4,638,289 A | 1/1987 | Zottnik |
| 4,646,241 A | 2/1987 | Ratchford et al. |
| 4,651,143 A | 3/1987 | Yamanaka |
| 4,758,888 A | 7/1988 | Lapidot |
| 4,763,745 A | 8/1988 | Eto et al. |
| 4,785,474 A | 11/1988 | Bernstein et al. |
| 4,789,904 A | 12/1988 | Peterson |
| 4,794,566 A | 12/1988 | Richards et al. |
| 4,804,937 A | 2/1989 | Barbiaux et al. |
| 4,806,931 A | 2/1989 | Nelson |
| 4,837,628 A | 6/1989 | Sasaki |
| 4,839,631 A | 6/1989 | Tsuji |
| 4,843,463 A | 6/1989 | Michetti |
| 4,843,578 A | 6/1989 | Wade |
| 4,876,597 A | 10/1989 | Roy et al. |
| 4,883,349 A | 11/1989 | Mittelhauser |
| 4,896,855 A | 1/1990 | Furnish |
| 4,930,742 A | 6/1990 | Schofield et al. |
| 4,936,533 A | 6/1990 | Adams et al. |
| 4,939,652 A | 7/1990 | Steiner |
| 4,942,464 A | 7/1990 | Milatz |
| 4,945,244 A | 7/1990 | Castleman |
| 4,949,186 A | 8/1990 | Peterson |
| 4,980,913 A | 12/1990 | Skret |
| 4,987,541 A | 1/1991 | Levente et al. |
| 4,992,943 A | 2/1991 | McCracken |
| 5,012,335 A | 4/1991 | Cohodar |
| 5,027,104 A | 6/1991 | Reid |
| 5,056,056 A | 10/1991 | Gustin |
| 5,057,820 A | 10/1991 | Markson et al. |
| 5,096,287 A | 3/1992 | Kakinami et al. |
| 5,100,095 A | 3/1992 | Haan et al. |
| 5,111,289 A | 5/1992 | Lucas et al. |
| 5,140,434 A | 8/1992 | Van Blessinger et al. |
| 5,140,436 A | 8/1992 | Blessinger |
| 5,144,661 A | 9/1992 | Shamosh et al. |
| 5,178,448 A | 1/1993 | Adams et al. |
| 5,196,938 A | 3/1993 | Blessinger |
| 5,223,844 A | 6/1993 | Mansell et al. |
| 5,262,813 A | 11/1993 | Scharton |
| 5,308,247 A | 5/1994 | Dyrdek |
| 5,311,197 A | 5/1994 | Sorden et al. |
| 5,321,753 A | 6/1994 | Gritton |
| 5,327,288 A | 7/1994 | Wellington et al. |
| 5,330,149 A | 7/1994 | Haan et al. |
| 5,343,527 A | 8/1994 | Moore |
| 5,353,023 A | 10/1994 | Mitsugi |
| 5,361,326 A | 11/1994 | Aparicio, IV et al. |
| 5,387,926 A | 2/1995 | Bellan |
| 5,388,045 A | 2/1995 | Kamiya et al. |
| 5,404,330 A | 4/1995 | Lee et al. |
| 5,408,330 A | 4/1995 | Squicciarini et al. |
| 5,422,543 A | 6/1995 | Weinberg |
| 5,430,431 A | 7/1995 | Nelson |
| 5,430,432 A | 7/1995 | Camhi et al. |
| 5,435,184 A | 7/1995 | Pineroli et al. |
| 5,445,024 A | 8/1995 | Riley, Jr. et al. |
| 5,445,027 A | 8/1995 | Zorner |
| 5,446,659 A | 8/1995 | Yamawaki |
| 5,455,625 A | 10/1995 | Englander |
| 5,455,716 A | 10/1995 | Suman et al. |
| 5,473,729 A | 12/1995 | Bryant et al. |
| 5,477,141 A | 12/1995 | Nather et al. |
| 5,495,242 A | 2/1996 | Kick et al. |
| 5,497,419 A | 3/1996 | Hill |
| 5,499,182 A | 3/1996 | Ousborne |
| 5,504,482 A | 4/1996 | Schreder |
| 5,515,285 A | 5/1996 | Garrett, Sr. et al. |
| 5,521,633 A | 5/1996 | Nakajima et al. |
| 5,523,811 A | 6/1996 | Wada et al. |
| 5,526,269 A | 6/1996 | Ishibashi et al. |
| 5,530,420 A | 6/1996 | Tsuchiya et al. |
| 5,537,156 A | 7/1996 | Katayama |
| 5,539,454 A | 7/1996 | Williams |
| 5,541,590 A | 7/1996 | Nishio |
| 5,544,060 A | 8/1996 | Fujii et al. |
| 5,548,273 A | 8/1996 | Nicol et al. |
| 5,552,990 A | 9/1996 | Ihara et al. |
| 5,559,496 A | 9/1996 | Dubats |
| 5,568,211 A | 10/1996 | Bamford |
| 5,570,127 A | 10/1996 | Schmidt |
| 5,574,443 A | 11/1996 | Hsieh |
| D376,571 S | 12/1996 | Kokat |
| 5,581,464 A | 12/1996 | Woll et al. |
| 5,590,948 A | 1/1997 | Moreno |
| 5,596,382 A | 1/1997 | Bamford |
| 5,610,580 A | 3/1997 | Lai |
| 5,612,686 A | 3/1997 | Takano et al. |
| 5,631,638 A | 5/1997 | Kaspar et al. |
| 5,638,273 A | 6/1997 | Coiner et al. |
| 5,642,106 A | 6/1997 | Hancock et al. |
| 5,646,856 A | 7/1997 | Kaesser |
| 5,652,706 A | 7/1997 | Morimoto et al. |
| RE35,590 E | 8/1997 | Bezos et al. |
| 5,654,892 A | 8/1997 | Fujii et al. |
| 5,659,355 A | 8/1997 | Barron et al. |
| 5,667,176 A | 9/1997 | Zamarripa et al. |
| 5,669,698 A | 9/1997 | Veldman et al. |
| 5,671,451 A | 9/1997 | Takahashi et al. |
| 5,677,979 A | 10/1997 | Squicciarini et al. |
| 5,680,117 A | 10/1997 | Arai et al. |
| 5,680,123 A | 10/1997 | Lee |
| 5,689,442 A | 11/1997 | Swanson et al. |
| 5,696,705 A | 12/1997 | Zykan |
| 5,706,362 A | 1/1998 | Yabe |
| 5,712,679 A | 1/1998 | Coles |
| 5,717,456 A | 2/1998 | Rudt et al. |
| 5,719,554 A | 2/1998 | Gagnon |
| 5,784,521 A | 7/1998 | Nakatani et al. |
| 5,790,403 A | 8/1998 | Nakayama |
| 5,790,973 A | 8/1998 | Blaker et al. |
| 5,793,420 A | 8/1998 | Schmidt |
| 5,794,165 A | 8/1998 | Minowa et al. |
| 5,797,134 A | 8/1998 | McMillan et al. |
| 5,798,458 A | 8/1998 | Monroe |
| 5,800,040 A | 9/1998 | Santo |
| 5,802,545 A | 9/1998 | Coverdill |
| 5,802,727 A | 9/1998 | Blank et al. |
| 5,815,093 A | 9/1998 | Kikinis |
| 5,825,412 A | 10/1998 | Hobson et al. |
| 5,844,505 A | 12/1998 | Van Ryzin |
| 5,896,167 A | 4/1999 | Omae et al. |
| 5,897,606 A | 4/1999 | Miura et al. |
| 5,899,956 A | 5/1999 | Chan |
| 5,901,806 A | 5/1999 | Takahashi |
| 5,914,748 A | 6/1999 | Parulski et al. |
| 5,926,210 A | 7/1999 | Hacket et al. |
| 5,946,404 A | 8/1999 | Bakshi et al. |
| 5,978,017 A | 11/1999 | Tino |

| | | |
|---|---|---|
| 6,002,326 A | 12/1999 | Turner |
| 6,008,723 A | 12/1999 | Yassan |
| 6,008,841 A | 12/1999 | Charlson |
| 6,009,370 A | 12/1999 | Minowa et al. |
| 6,011,492 A | 1/2000 | Garesche |
| 6,028,528 A | 2/2000 | Lorenzetti et al. |
| 6,037,860 A | 3/2000 | Zander et al. |
| 6,037,977 A | 3/2000 | Peterson |
| 6,064,792 A | 5/2000 | Fox et al. |
| 6,092,193 A | 7/2000 | Loomis et al. |
| 6,122,738 A | 9/2000 | Millard |
| 6,141,611 A | 10/2000 | Mackey et al. |
| 6,144,296 A | 11/2000 | Ishida et al. |
| 6,151,065 A | 11/2000 | Steed et al. |
| 6,163,338 A | 12/2000 | Johnson et al. |
| 6,167,186 A | 12/2000 | Kawasaki et al. |
| 6,181,373 B1 | 1/2001 | Coles |
| 6,185,490 B1 | 2/2001 | Ferguson |
| 6,211,907 B1 | 4/2001 | Seaman et al. |
| 6,218,960 B1 | 4/2001 | Ishikawa et al. |
| 6,246,933 B1 | 6/2001 | Bague |
| 6,253,129 B1 | 6/2001 | Jenkins et al. |
| 6,895,248 B1 * | 5/2005 | Akyol et al. ............. 455/452.1 |
| 7,100,190 B2 | 8/2006 | Johnson et al. |
| 2002/0059453 A1 * | 5/2002 | Eriksson et al. ............. 709/238 |
| 2005/0159964 A1 * | 7/2005 | Sonnenrein et al. ............ 705/1 |
| 2005/0258942 A1 * | 11/2005 | Manasseh et al. ........ 340/425.5 |
| 2006/0015233 A1 * | 1/2006 | Olsen et al. ................... 701/50 |
| 2006/0095349 A1 * | 5/2006 | Morgan et al. ................ 705/29 |
| 2006/0242680 A1 | 10/2006 | Johnson et al. |
| 2007/0143499 A1 * | 6/2007 | Chang ........................ 709/245 |

FOREIGN PATENT DOCUMENTS

| | | |
|---|---|---|
| JP | 5-137144 | 6/1993 |
| JP | 5-294188 | 11/1993 |
| JP | 8-124069 | 5/1996 |
| JP | 10-076880 | 3/1998 |
| WO | WO 88/09023 | 11/1988 |
| WO | WO 90/05076 | 5/1990 |
| WO | WO 94/27844 | 12/1994 |
| WO | WO 96/00957 | 1/1996 |
| WO | WO 97/01246 | 1/1997 |
| WO | WO 99/37503 | 7/1999 |
| WO | WO 99/40545 | 8/1999 |
| WO | WO 99/62741 | 12/1999 |
| WO | WO 00/48033 | 8/2000 |
| WO | WO 00/77620 | 12/2000 |
| WO | WO 01/25054 | 4/2001 |

OTHER PUBLICATIONS

US Receiving Office, Written Opinion of the International Searching Authority, Oct. 15, 2007.

* cited by examiner

SYSTEM AND METHOD FOR WIRELESS DELIVERY OF EVENT DATA

RELATED APPLICATIONS

The present application is a continuation-in-part of co-pending U.S. patent application Ser. Nos. 11/382,222 and 11/382,239, filed May 8, 2006; and Ser. Nos. 11/382,325 and 11/382,328, filed May 9, 2006, of concurrent ownership, all of which are incorporated herein by reference in their entirety.

BACKGROUND

1. Field of the Invention

The present invention relates generally to systems for collecting information on driver performance for subsequent event based analysis and counseling of fleet drivers and the like, and is particularly concerned with a system and method for transfer of stored event data from a fleet vehicle to an evaluation server.

2. Related Art

Many companies employing fleet drivers for operating their vehicles use some type of monitoring system for collecting and evaluation of information on driver performance. One issue with vehicle mounted event detectors is the control of transmission of the stored data from the event detector to an evaluation server. Normally, data from successive events will be stored by the event detector and periodically downloaded from the event detector to the evaluation server. However, it is important to conserve memory resources in the vehicle mounted device, and to ensure that stored data is downloaded whenever driver conditions change, for example when a trip is completed or a driver change takes place. Timely removal of the events from the event detector to the evaluation server also promotes counseling effectiveness, as counseling is more effective when it happens quickly after the events that need to be counseled were generated.

SUMMARY

It is an object of the present invention to provide a new and improved system and method for delivery of stored event data from an event detector in a vehicle to a remote evaluation server.

According to one aspect of the present invention, a method of transferring data from an event detector in a vehicle to an evaluation server comprises the steps of capturing driving events at an event detector in a vehicle and storing the captured driving events in a data storage area, monitoring the output of at least a first sensor in the vehicle, and sending the stored driving event data to an evaluation server over a wireless communication network when a data transfer condition is detected, the data transfer condition comprising at least detection of a predetermined output from the first sensor.

In one embodiment of the invention, the event detector searches for an access point whenever the predetermined output from the first sensor is detected. If an access point is detected, the stored data is transmitted to the evaluation server via the access point. The stored data is not transmitted unless the vehicle is in the vicinity of an access point. In this case, the data transfer condition comprises a combination of detection of the predetermined output from the first sensor and detection of an access point in the vicinity of the vehicle. The first sensor may be an accelerometer or other motion detector and the predetermined output may correspond to a substantially stopped or stationary condition of the vehicle. The predetermined sensor output or threshold in the exemplary embodiment of this version of the invention is not zero. The sensor threshold is set to identify when the vehicle is not moving. The data must be transferred as quickly as possible when the vehicle stops, to allow for quick switch situations such as driver changes, refueling and the like. In some cases, a vehicle stops at a fleet yard only briefly to refuel and change drivers, for example, and this can take place without turning off the vehicle's engine.

In this embodiment, when a fleet vehicle returns to a fleet yard and parks on completion of an assignment, the event detector determines that the vehicle has stopped and sends out a query to find out if there is an access point or docking station. Normally, a docking station is provided at each fleet yard. If the docking station is detected, all of the stored data is transmitted to the docking station, and transferred from the docking station to the evaluation server. When the event data has been transmitted, it is deleted from the local memory in the vehicle, providing memory space for storage of subsequent driving events. If a docking station is not found, for example because the vehicle is temporarily stopped in traffic or stopped for some other reason, the data is not transmitted, and the event detector continues to monitor the sensor output for the next detected stop condition.

This method avoids the need to have the event detector check for proximity with an access point or docking station at periodic intervals, which could run down the battery.

In another embodiment of the invention, the event detector in the vehicle is programmed to look for wireless access points and to download its event data whenever it comes into proximity with an access point. Any suitable sensor may be used for determining proximity to an access point, such as a global positioning system ("GPS") sensor which determines the GPS location of the vehicle and matches that position with known wireless access points. Alternatively, the event detector may include a sensor or receiver which looks for a beacon signal of an access point. The wireless access point may be a docking station at a fleet yard, or a cell tower or base station of any type of wireless data network such as a local area network ("LAN"), a wide area network ("WAN"), a wireless wide area network ("WWAN"), a cellular network, or an IEEE 802 wireless network such as an IEEE 802.11 ("WiFi") network.

By downloading event data to the evaluation server whenever an event detector in a vehicle comes into proximity with an access point, the event detector can conserve memory resources.

Other features and advantages of the present invention will become more readily apparent to those of ordinary skill in the art after reviewing the following detailed description and accompanying drawings.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

FIGS. 1 to 4 of the drawings illustrate an exemplary embodiment of a vehicle-mounted system for capturing and storing driving events, while FIGS. 6 to 10 illustrate systems and methods for controlling wireless transfer of stored event data from the in-vehicle event detector of FIGS. 1 to 4 to an evaluation server according to exemplary embodiments of the invention. The evaluation server allows an analyst to review the raw event data and create a counseling program directed toward future avoidance of the risky behavior that caused the event. Additionally, the evaluation server compiles reports regarding the events for particular drivers or groups of drivers. The reports are then provided to management by the evaluation server and the counseling programs are provided to the individual drivers or groups of drivers to improve their future avoidance of risky driving behaviors. The reports may also be used in forensic accident analysis and data mining.

After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

Figure 1:
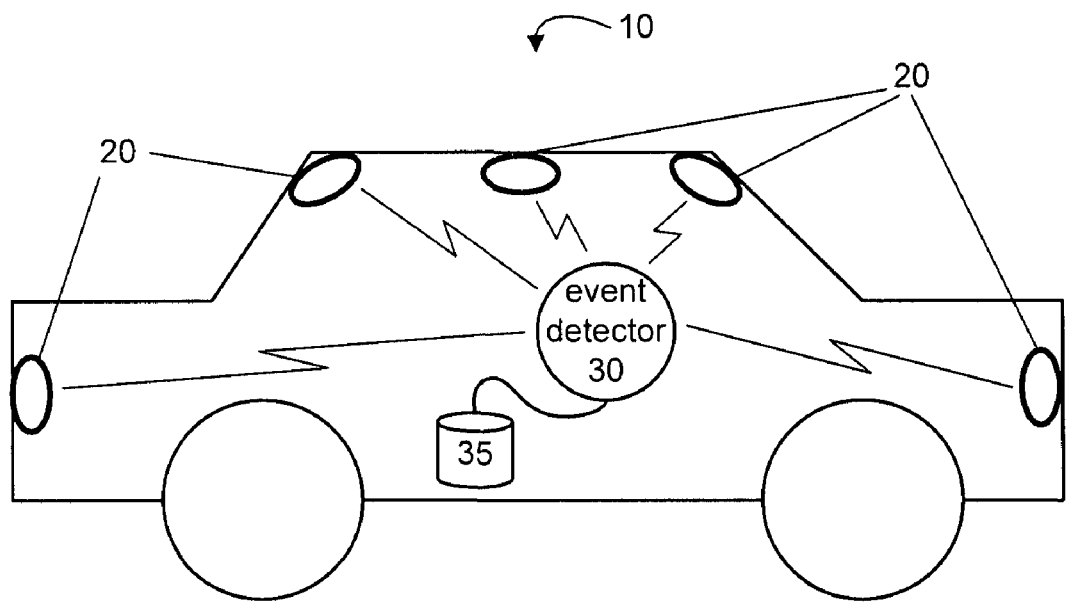
FIG. 1 is a block diagram illustrating an event detector and associated event capture devices deployed in a vehicle according to an exemplary embodiment of the invention.

FIG. 1 is a block diagram illustrating an example event detector 30 in control of a plurality of event capture devices 20 deployed in a vehicle 10 according to an embodiment of the present invention. In the illustrated embodiment, the event detector 30 is integrated with the vehicle 10 and is communicatively coupled with the event capture devices 20. The event detector 30 is also configured with data storage 35.

The event detector 30 can be any of a variety of types of computing devices with the ability to execute programmed instructions, receive input from various sensors, and communicate with one or more internal or external event capture devices 20 and other external devices (not shown). An example general purpose wireless communication device that may be employed as all or a portion of an event detector 30 is later described with respect to FIGS. 3 and 5.

Event capture devices 20 continuously capture and record data into a temporary buffer, and the recorded data may then be overwritten with subsequently captured data unless an event is identified. When the event detector 30 identifies an event, the event detector 30 instructs the one or more event capture devices 20 to preserve the data captured immediately prior to the event (pre-event data) by transferring it from the temporary buffer to the data storage area 35, and to continue transferring during the event data, and post-event data as it is captured to the data storage area 35. Events may comprise a variety of situations, including automobile accidents, reckless driving, rough driving, or any other type of stationary or moving occurrence that the owner of a vehicle 10 may desire to know about.

The vehicle 10 may have a plurality of event capture devices placed in various locations around the vehicle 10. An event capture device 20 may comprise a video camera, still camera, microphone, and other types of data capture devices. For example, an event capture device 20 may include an accelerometer that senses changes in speed or direction. Additional sensors and/or data capture devices may also be incorporated into the system in order to provide a rich set of information about a detected event.

The data storage area 35 can be any sort of internal or external, fixed or removable memory device and may include both persistent and volatile memories. The function of the data storage area 35 is to maintain data for long term storage and also to provide efficient and fast access to instructions for applications or modules that are executed by the event detector 30.

In one embodiment, event detector 30 in combination with the one or more event capture devices 20 identifies an event and stores certain audio and video data along with related information about the event. For example, related information may include the speed of the vehicle when the event occurred, the direction the vehicle was traveling, the location of the vehicle (e.g., from a global positioning system ("GPS") sensor), and other information from sensors located in and around the vehicle or from the vehicle itself (e.g., from a data bus integral to the vehicle such as an on board diagnostic or "OBD" vehicle bus). This combination of audio, video, and other data is compiled into an event that can be stored in data storage 35 onboard the vehicle for later delivery to an evaluation server.

Figure 2:
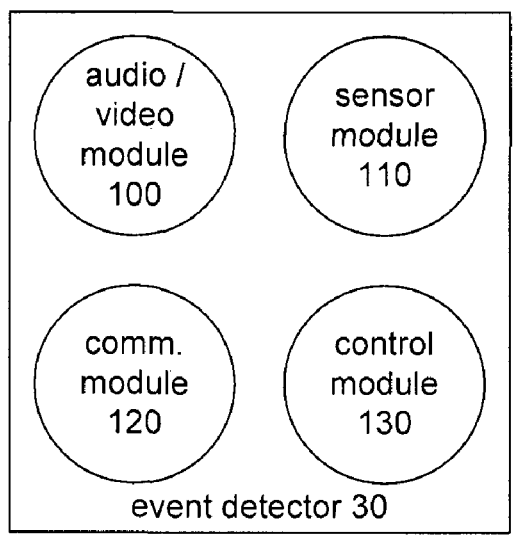
FIG. 2 is a block diagram illustrating an example of the event detector of FIG. 1.

FIG. 2 is a block diagram illustrating an example event detector 30 according to an embodiment of the present invention. In the illustrated embodiment, the event detector 30 comprises an audio/video ("AV") module 100, a sensor module 110, a communication module 120, and a control module 130. Additional modules may also be employed to carry out the various functions of the event detector 30, as will be understood by those having skill in the art.

The AV module 100 is configured to manage the audio and video input from one or more event capture devices and storage of the audio and video input. The sensor module 110 is configured to manage one or more sensors that can be integral to the event detector 30 or external from the event detector 30. For example, an accelerometer may be integral to the event detector 30 or it may be located elsewhere in the vehicle and connected to the event detector. The sensor module 110 may also manage other types of sensor devices such as a GPS sensor, temperature sensor, moisture sensor, or the like (all not shown).

The communication module 120 is configured to manage communications between the event detector 30 and other devices and modules. For example, the communication module 120 may handle communications between the event detector 30 and the various event capture devices. The communication module 120 may also handle communications between the event detector 30 and a memory device, a docking station, or a server such as an evaluation server. The communication module 120 is configured to communicate with these various types of devices and other types of devices via a direct wire link (e.g., USB cable, firewire cable), a direct wireless link (e.g., infrared, Bluetooth), or a wired or wireless network link such as a local area network ("LAN"), a wide area network ("WAN"), a wireless wide area network ("WWAN"), or an Institute of Electrical and Electronics Engineers 802 ("IEEE 802") wireless network such as an IEEE 802.11 ("WiFi") network.

The control module 130 is configured to control the actions of remote devices such as the one or more event capture devices. For example, the control module 130 may be configured to instruct the event capture devices to capture an event and return the data to the event detector when it is informed by the sensor module 110 that certain trigger criteria have been met that identify an event.

Figure 3:
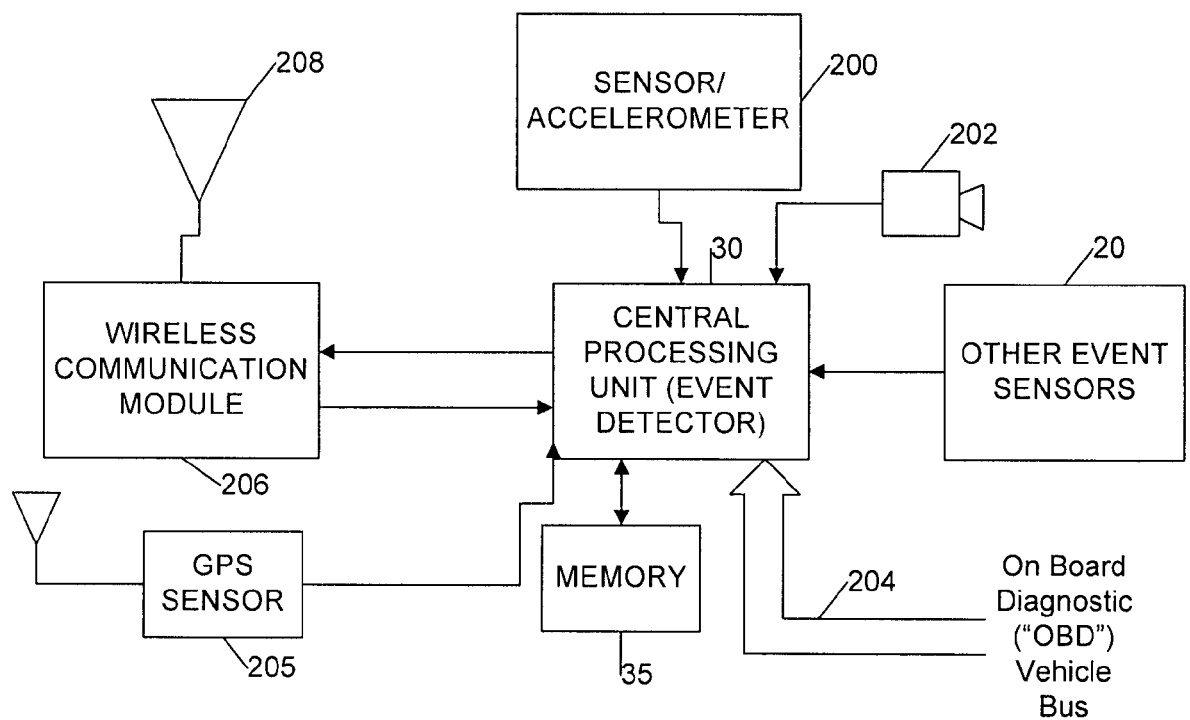
FIG. 3 is a more detailed block diagram of the event detector and associated modules.

Although the event detector 30, data storage 35, and event capture devices or sensors 20 are shown separately in FIG. 1, some or all of these components may be incorporated in a single housing in some embodiments of the invention. FIG. 3 is a more detailed block diagram of the event detector and associated modules for capturing, storing, and transmitting driving event data. The central processing unit or event detector 30 includes the processor modules 100, 110, 120, and 130 illustrated in FIG. 2, and has an associated memory or data storage 35. A plurality of sensors/event capture devices are connected to the central processing unit. At least one of the sensors is a motion sensor 200 such as an accelerometer or the like. One or more video cameras 202 are appropriately positioned in the vehicle for recording driving events and have outputs connected to the audio/video module 100 of the central processing unit/event detector 30. Various other event sensors 20 will also be included in the system and connected to the central processing unit/event detector 30, as schematically indicated in FIG. 3.

The central processing unit 30 is also connected to an on board diagnostic ("OBD") vehicle bus 204 which is integral to the vehicle and which will provide information on the current vehicle status. A global positioning system ("GPS") sensor 205 is also connected to the central processing unit. The GPS sensor may be standard and provided with the vehicle, for vehicles which have on-board location tracking, or may be provided as part of the event detector system which is installed in the vehicle.

Figure 5:
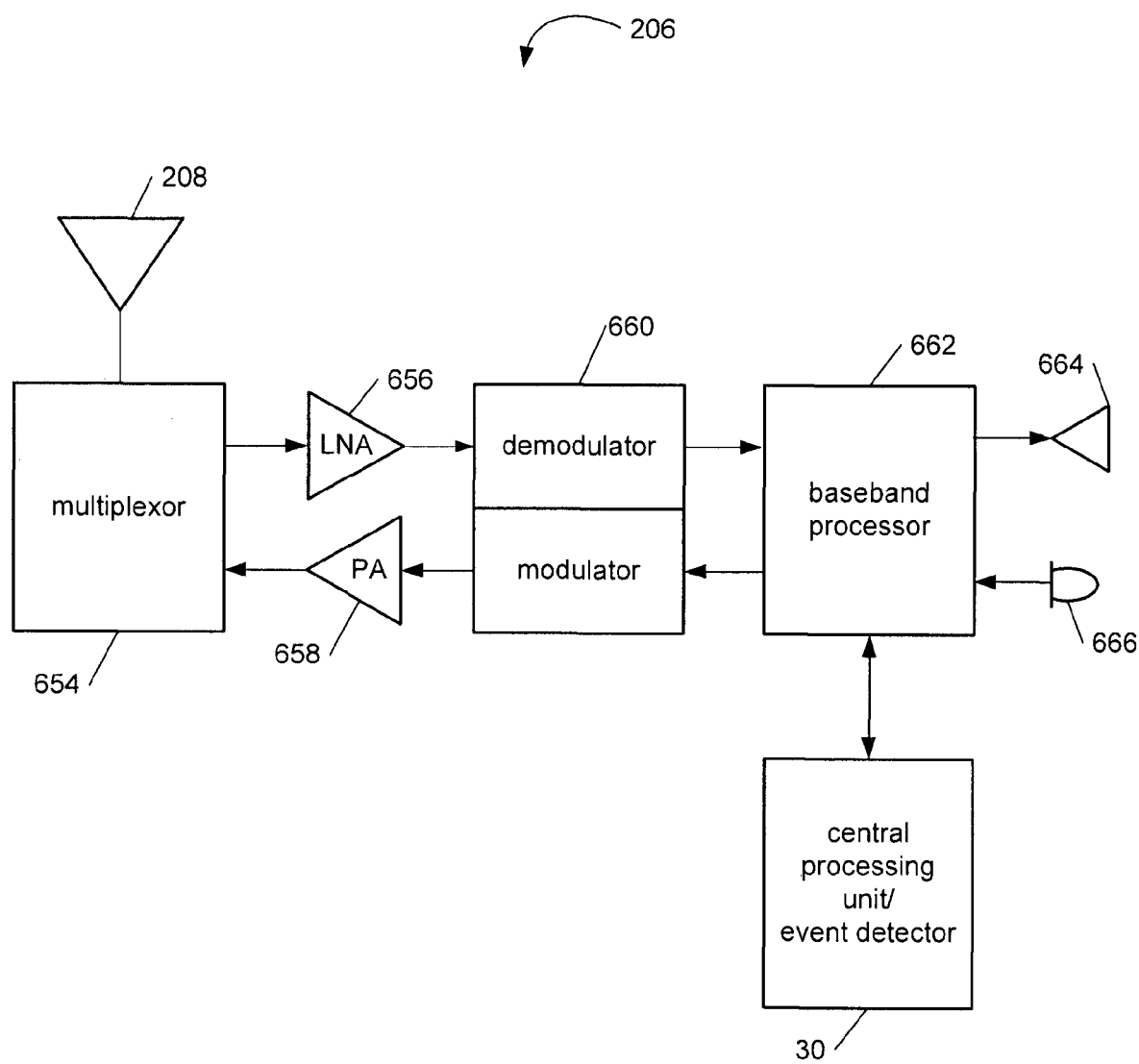
FIG. 5 is a block diagram illustrating an exemplary wireless communication module that may be used in connection with the various embodiments described herein.

Central processing unit/event detector 30 is also connected to a wireless communication module 206 having an antenna 208 for wireless transmission of stored data from the data storage area 35 to an evaluation server, as will be described in more detail below. An exemplary wireless communication module 206 is illustrated in FIG. 5. However, other wireless communication devices and/or architectures may also be used, as will be clear to those skilled in the art. In the illustrated embodiment, wireless communication module 206 is used for audio communications to and from the vehicle as well as for communication of event data from the event detector, but it may be simply used for communication of data to and from the vehicle in other embodiments, in which case the speaker and microphone will be omitted.

As illustrated in FIG. 5, wireless communication device or module 206 may comprise a multiplexor 600 connected to antenna 208, a low noise amplifier ("LNA") 656, a power amplifier ("PA") 658, and a modulation circuit 660 which is connected to baseband processor 662. In the wireless communication device 206, radio frequency ("RF") signals are transmitted and received by antenna 652. Multiplexor 654 acts as a switch, coupling antenna 652 between the transmit and receive signal paths. In the receive path, received RF signals are coupled from a multiplexor 654 to LNA 656. LNA 656 amplifies the received RF signal and couples the amplified signal to a demodulation portion of the modulation circuit 660.

Typically modulation circuit 660 will combine a demodulator and modulator in one integrated circuit ("IC"). The demodulator and modulator can also be separate components. The demodulator strips away the RF carrier signal leaving a base-band receive audio signal, which is sent from the demodulator output to the base-band processor 662.

If the base-band receive audio signal contains audio information, then base-band processor 662 decodes the signal and converts it to an analog signal. Then the signal is amplified and sent to the speaker 664. The base-band processor 662 also receives analog audio signals from the microphone 666. These analog audio signals are converted to digital signals and encoded by the base-band processor 662. The base-band processor 662 also codes the digital signals for transmission and generates a base-band transmit audio signal that is routed to the modulator portion of modulation circuit 660. The modulator mixes the base-band transmit audio signal with an RF carrier signal generating an RF transmit signal that is routed to the power amplifier 658. The power amplifier 658 amplifies the RF transmit signal and routes it to the multiplexor 654 where the signal is switched to the antenna port for transmission by antenna 652.

The baseband processor 662 is also communicatively coupled with the central processing unit or event detector 30. The central processing unit 30 has access to a data storage area 35, as illustrated in FIG. 3, and is configured to execute instructions (i.e., computer programs or software) that can be stored in the data storage area 35. Computer programs can also be received from the baseband processor 662 and stored in the data storage area 35 or executed upon receipt. Such computer programs, when executed, enable the wireless communication device 206 to perform the various functions of the present invention as will be described below.

Figure 4:
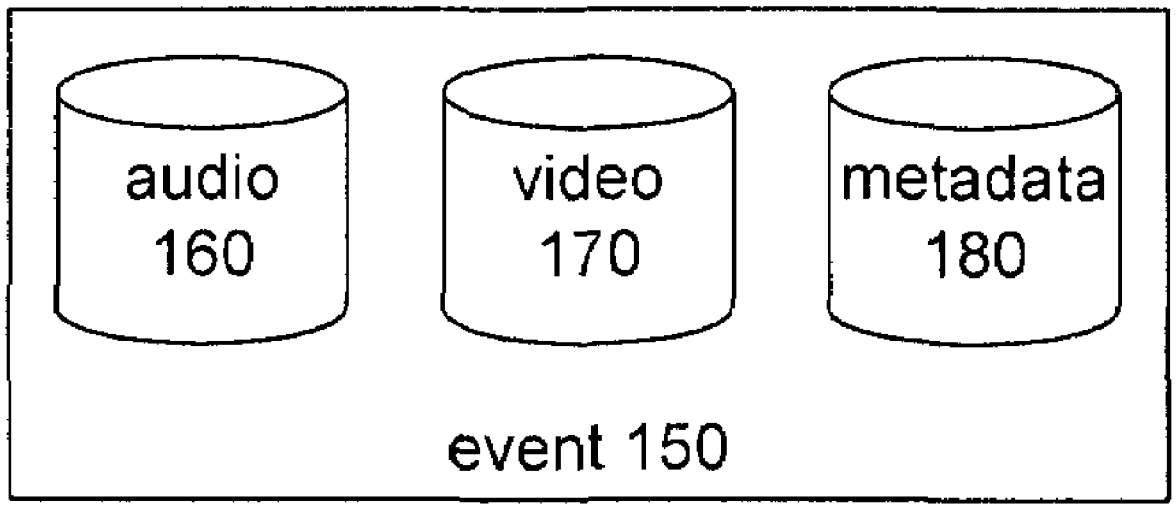
FIG. 4 is a block diagram illustrating an example of captured event data in the event detector of FIGS. 1 to 3.

FIG. 4 is a block diagram illustrating an example event 150 according to an embodiment of the present invention. In the illustrated embodiment, the event 150 comprises audio data 160, video data 170, and meta data 180. The audio data 160 can be collected from inside the vehicle, outside the vehicle, and may include information from an internal vehicle bus 204 about the baseline noise level of the operating vehicle, if such information is available. Additional information about baseline noise level, radio noise level, conversation noise level, or external noise level may also be included in audio data 160.

Video data 170 may include still images or moving video captured by one or more cameras in various locations in and around the vehicle. Video data 170 may include images or video from inside the vehicle, outside the vehicle, or both. In one particularly advantageous embodiment, still images and moving video that illustrate the entire area inside the vehicle and the entire 360 degree area surrounding the vehicle are captured by a plurality of image capture devices and included in video data 170.

Meta data 180 may include a variety of additional information that is available to the event detector 30 at the time of an event. Such additional data may include the velocity and direction of the vehicle, the GPS location of the vehicle, elevation, time, temperature, and vehicle engine and electrical component information captured from an internal vehicle bus such as OBD bus 204, just to name a few. Additional information may also be included such as the number of occupants in the vehicle, whether seatbelts were fastened, whether airbags deployed, whether evasive maneuvering was attempted as determined by the route of the vehicle prior to the event. As will be understood by those skilled in the art, meta data 180 may include an extremely rich variety of information limited only by the scope and type of information obtained prior to, during, and after an event.

Figure 6:
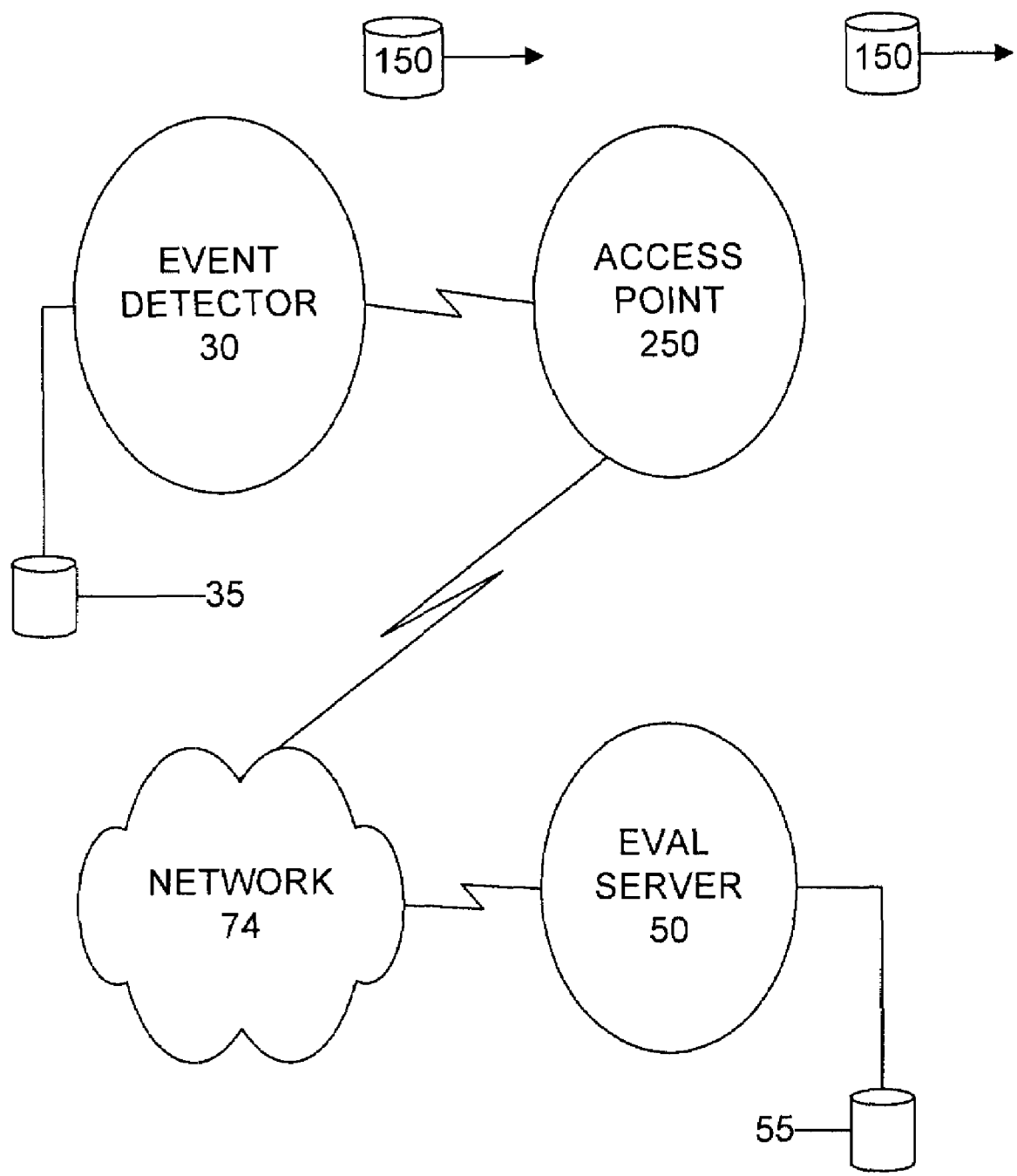
FIG. 6 is a network diagram illustrating transfer of stored event data from the event detector to an evaluation server in a system for wireless delivery of event data according to an exemplary embodiment of the invention.
Figure 7:
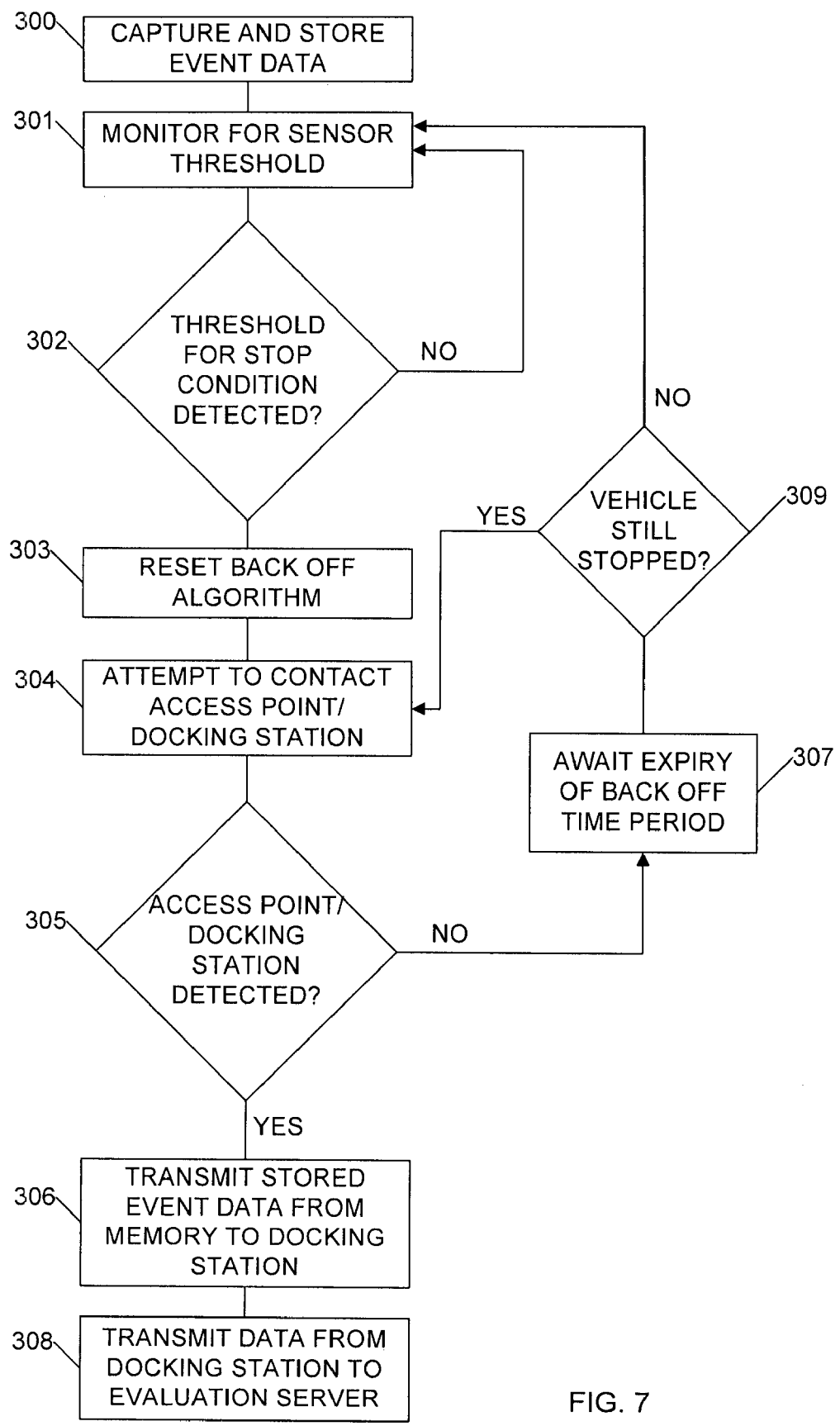
FIG. 7 is a flow diagram illustrating an exemplary method of transferring data from the event detector to the evaluation server in one embodiment of the invention.

In any one trip of a fleet vehicle, one or more driving events may be detected, captured, and stored in data storage area 35 as a series of events 150. The event detector 30 is configured to transmit all of the stored events to an evaluation server 50 under a predetermined data transfer condition, for example as illustrated in the embodiment of FIGS. 6 and 7. In FIG. 6, stored event data 150 is transmitted via a direct wireless link to an access point 250. The direct wireless link may be an infrared link, a Bluetooth link, an IEEE 802.11 link, or the like. The data 150 is then transmitted from the access point 250 to an evaluation server 50 via network 74. Evaluation server 50 is coupled to data storage area 55.

Evaluation server 50 may be local to access point 250 or remote from access point 250. Network 74 may be a wireless or wired network or a combination of the two. The network 74 may be private or public in whole or in part and may include the Internet. Access point 250 may be a docking station at a fleet yard, or may be a network access point or base station of a wireless network of any type.

FIG. 7 illustrates one embodiment of a method for controlling transmission of stored event data 150 from data storage area 35 of the event detector 30 to evaluation server 50. Control of this transmission is required to ensure that the limited storage space in the local storage area 35 in the vehicle is conserved, and also to ensure that stored data is transferred when each change in driving conditions occurs, such as a new trip or a driver change. During each trip of vehicle 10, event detector 30 will identify any driving event which meets the criteria for capture, and capture and store event data associated with such an event (300). At the same time, the event detector 30 monitors the output of at least one of the sensors for a predetermined threshold value (step 301) indicating that the vehicle is substantially stopped or stationary. The sensor may be a motion sensor such as an accelerometer 200 as illustrated in FIG. 3, for example, but any type of sensor which can sense vehicle motion may be used for this purpose.

When the threshold value for a stopped condition of the vehicle is detected (step 302), a backoff time interval is reset 303, and the event detector attempts to contact an access point (step 304). This may be done by sending out a query to determine whether or not it is in the vicinity of an access point, which in this case is a docking station. Rather than sending a query, the event detector may just listen for a pilot signal from an access point. This option would conserve battery power. In either case, if an access point or docking station is detected (305), the combination of a stopped condition of the vehicle with detection of an access point results in transmission of event data.

In one embodiment, docking stations are provided at fleet yards of a fleet company to provide for downloading of any relevant information regarding a trip of a fleet vehicle. The query 305 will be in the form of a message to the docking station, and a response will be sent to the vehicle from the docking station if it is in the vicinity. Alternatively, as noted above, the event detector simply listens for a pilot signal from the access point. If a docking station is detected at step 305, stored event data will be transmitted (step 306) via wireless communication module 206 from the vehicle to the docking station (i.e. access point 250 in FIG. 6). The data is then transmitted from the docking station to the evaluation server (308) over network 74, which may be wireless, wired, or a combination of wireless and wired transmission.

If an access point or docking station is not detected at step 305, this may mean that the vehicle is not in the vicinity of an access point or docking station. It may also mean that the access point or docking station was not detected due to packet collision, poor signal conditions, or other temporary conditions preventing communications. In the event that an access point or docking station is not detected at step 305, the event detector awaits expiry of a backoff time period as set by a backoff algorithm (307), and when this time period expires, if the vehicle is still stopped (309), the event detector again attempts to contact an access point (304), and will transmit stored event data (306) if an access point is detected at step 305. The event detector attempts to contact an access point repeatedly while the vehicle is stopped, with the time period between attempts controlled by the backoff algorithm. If the vehicle is moving again before expiry of the time period determined by the backoff algorithm, the event detector monitors for the next stop condition.

As noted above, the backoff algorithm is reset at step 303 in response to any transition from moving to a stopped condition. The backoff algorithm initially sets the backoff to a short time interval. The time interval increases as successive attempts fail to find an access point. In one embodiment, the backoff time interval may be increased after one failed attempt. In other embodiments, the backoff time interval is increased only after two or more failed attempts. This has the effect of saving vehicle battery when a vehicle is left parked for a long period of time. The backoff time interval is initially short, because when the vehicle has just stopped, the battery will have been charged while the vehicle engine was running, and running down the vehicle battery will therefore not be a major concern. The short initial backoff time interval also takes advantage of the increased probability of finding an access point when the vehicle has just stopped. After a number of repeated attempts at short time intervals fail to find an access point, the backoff time interval is lengthened, so that the battery is not run down if the vehicle remains stopped for an extended period of time. In one embodiment, the backoff timer is programmed to change the backoff timer level after two failed attempts to find an access point. However, in alternative embodiments, the backoff timer level or time interval may be increased after three or more failed attempts.

The event detector looks for a data transfer condition before transmitting its stored data to an access point such as a docking station. In this embodiment, the data transfer condition is a combination of detecting a predetermined threshold output from a sensor, such as an accelerometer, and detecting a docking station in the vicinity of the vehicle. The threshold setting is critical, since it is important to detect stopping of the vehicle in sufficient time to accomplish the data transfer, even in a quick change situation such as a driver change. Where the sensor is an accelerometer, the threshold setting is not zero, and is designed to detect when the vehicle is close to a stop. A threshold of the order of 0.08 G for an accelerometer, where G is equal to the gravitational acceleration, may be used to initiate the query for a docking station or listening for a docking station pilot signal. The threshold needs to be sufficiently above normal noise level of the motion sensor so that it will never be exceeded based purely on false negative. This threshold may be adjusted for different types of vehicles if necessary, based on testing for motion sensor noise levels to provide a threshold sufficiently above false negatives produced by noise, but it is believed that the 0.08 G level will be adequate for most purposes. There are several reasons why the accelerometer threshold setting needs to be above zero. One is noise in the system and manufacturing tolerances in the accelerometer and other components which may mean that a perfect zero reading is never achieved. There are also real-world causes why a small, but nonzero, amount of acceleration should not be taken to mean that the vehicle is moving. The vehicle may, for example, be parked on a gentle incline. Also, people leaving and entering the vehicle may cause it to rock, as may strong gusts of wind. The accelerometer threshold setting takes all of these considerations into account.

The docking station query will determine whether the vehicle is stopped in a fleet yard or stopped for some other reason, for example at a stop light or intersection, or stopping at a gas station or the like. No data transfer will occur in the latter situations.

Although the drawings illustrate a single sensor 200, it will be understood that multiple sensors may be used in conjunction to detect a vehicle stop condition. In this case, the output of any one sensor individually will not be sufficient to cause a check for an access point. Instead, the collective outputs of multiple sensors will be used to indicate a stop condition at step 302 of FIG. 7.

Although the event detector 30 may use information from the OBD vehicle bus 204 or be wired directly into the vehicle ignition for vehicle running information, and could potentially use this input to detect a stop condition, this may not work in a quick change situation. Use of a motion sensor or accelerometer to detect a vehicle stop will be more reliable, since information from the OBD or vehicle ignition will not detect stops made with the vehicle still running, whereas a motion sensor or accelerometer will detect such stops. Many or all key stops in a fleet vehicle system are made with the engine still running, and it is important that such stops are caught in order to enable downloading of events during such stops. A motion sensor or accelerometer is therefore used to detect such stops in the exemplary embodiment of FIGS. 6 and 7. In this embodiment, data is transferred from the data storage area of the event detector only when the vehicle is stopped in a fleet yard. The transferred data is deleted from the data storage area to leave space for storage of event data from the next trip of the vehicle 10.

The system and method of this embodiment controls the event detector to look for a docking station whenever the vehicle is at or close to a stop, when the vehicle is most likely to be in proximity of an access point or docking station. Data is transmitted only when the vehicle is at or close to a stop and an access point or docking station is found. This means that no attempt is made to look for an access point or docking station if the vehicle is not at or close to a stop, and no attempt is made to transfer data unless the vehicle is in the transmission range of an access point or docking station. This method avoids the need to have the event detector check for proximity with an access point or docking station at periodic intervals regardless of vehicle status, which could run down the battery.

The backoff timer determines when it is worthwhile to check for an access point. Checking for an access point is a relatively expensive operation from a power point of view, and the system is arranged only to look for an access point when one is fairly likely to be found. When a vehicle is moving, it is unlikely to be near an access point. Even if it is near an access point, it is unlikely to stay near it for long enough to perform a useful transfer. The system and method of this embodiment therefore does not look for an access point when the vehicle is moving. The highest probability of finding an access point is when a vehicle has just stopped, i.e. when it transitions from moving to not moving. It is important to check for an access point when this transition is detected, so as to best handle vehicles that have only brief stops at their home base. In this embodiment, a series of checks for access points are performed quickly after a vehicle that was moving first comes to a stop. When a vehicle remains stationary for an extended period, an access point is quite unlikely to come into range when one was not detected after the initial stop, although it is possible in some isolated situations, e.g. a new access point is set up, a broken access point is fixed, or an obstacle preventing detection of the access point is removed. This is why the backoff timer resets the time period between checks for access points to a longer interval after a vehicle has stopped and an access point is not initially found. When the vehicle is stopped for a long period of time, the engine is probably off, and too many checks for access points will drain the power and may run the battery flat. Therefore, checks for access points decrease in frequency fairly quickly after the vehicle stops, and become very infrequent due to the increase in the time interval set by the back-off timer.

Figure 8:
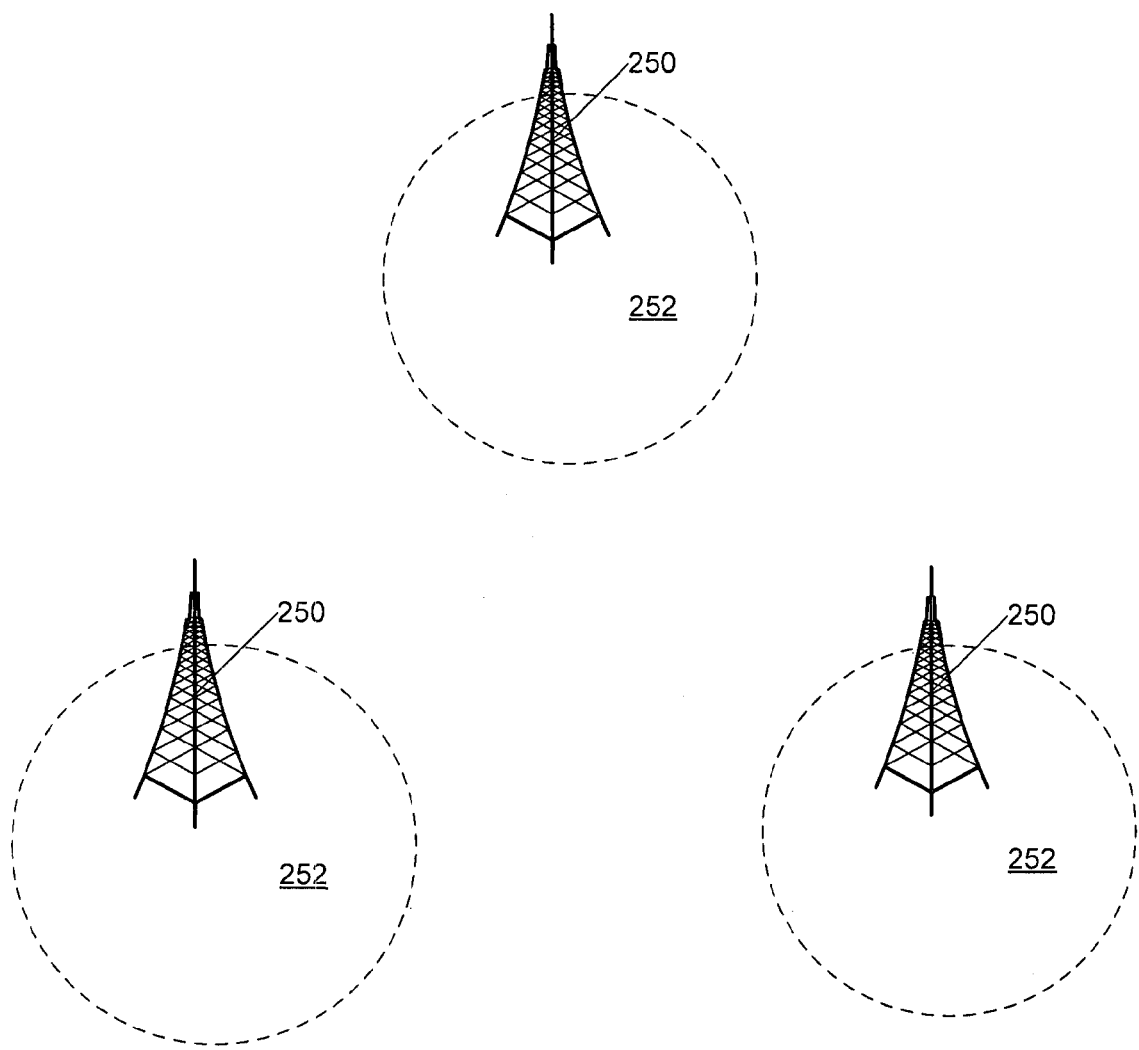
FIG. 8 is a block diagram of part of a wireless communication network with the vehicle of FIG. 1 moving into the range of one of the access points in the network.
Figure 9:
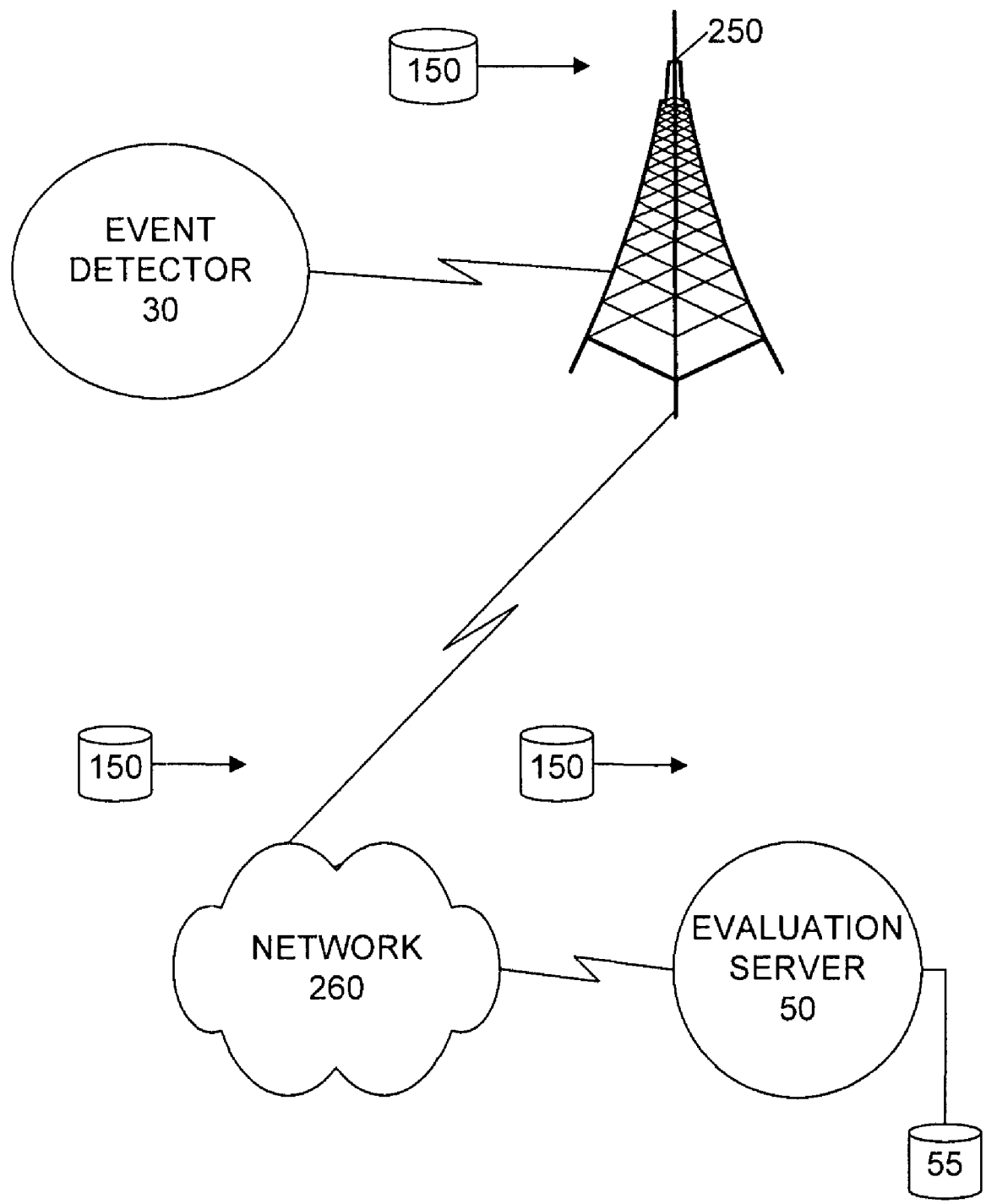
FIG. 9 is a network diagram illustrating transfer of stored event data from the event detector of FIGS. 1 to 4 over a wireless communication network as illustrated in FIG. 8, according to another embodiment of the invention.
Figure 10:
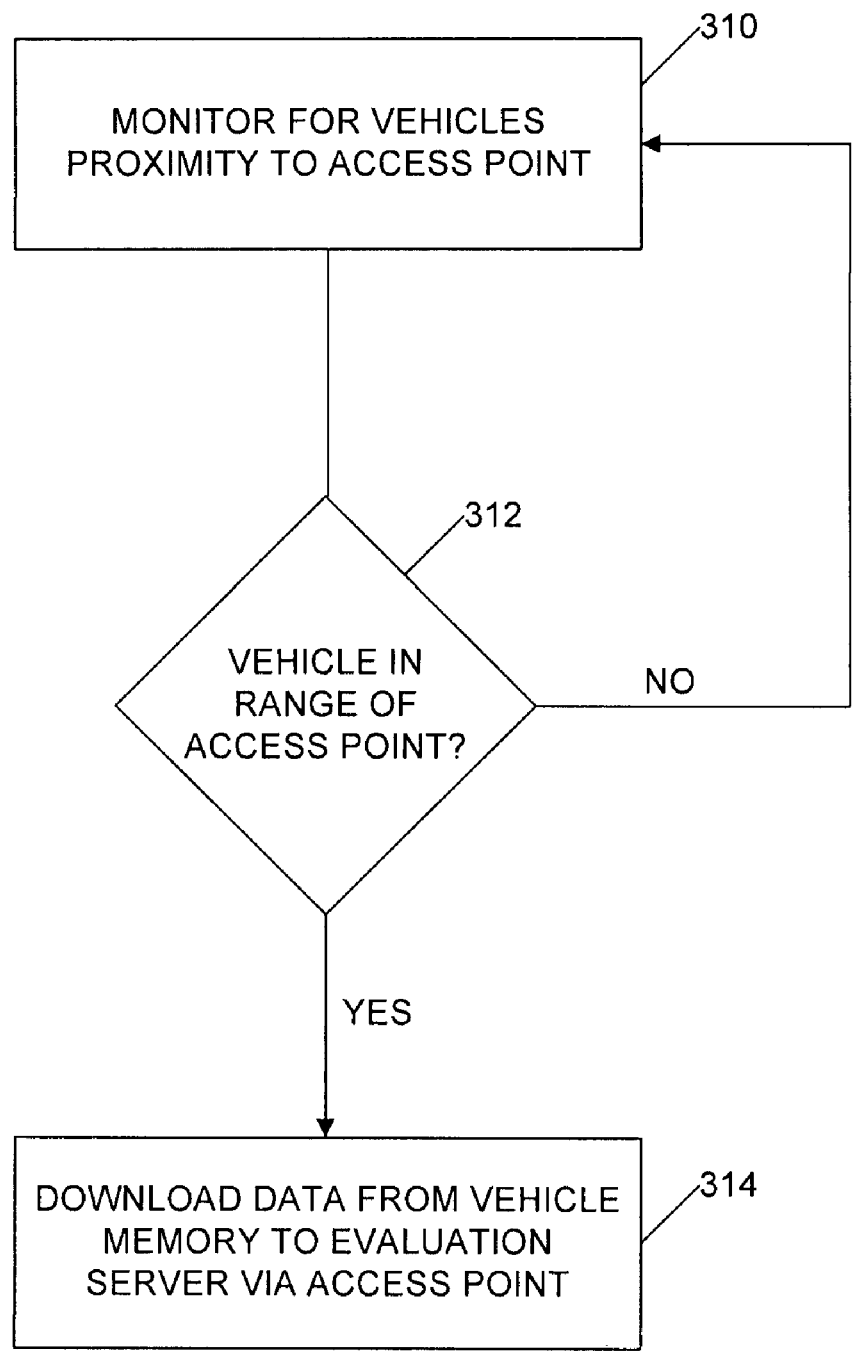
FIG. 10 is a flow diagram illustrating another exemplary method of transferring stored event data from an event detector to an evaluation server.

FIGS. 8 to 10 illustrate a method of controlling transfer of data from the data storage area 35 of event detector 30 according to another embodiment of the invention. FIG. 8 illustrates part of a wireless network including access points 250, which may be cell towers or base stations of any type of wireless network. Each access point 250 will serve a certain area 252, as indicated by the dotted outline surrounding each access point. In FIG. 8, vehicle 10 having an installed event detector system comprising event detector 30 and associated hardware and software is within the service area 252 of one of the access points 250.

In the method of FIGS. 8 to 10, the data transfer condition which initiates transfer of data from the event detector is a determination that the vehicle 10 is within range of a wireless network access point. As illustrated in FIG. 10, event detector 30 monitors for proximity of the vehicle with an access point 250 (step 310), so as to determine when the vehicle is in the service area or range of the access point. When the vehicle is determined to be within range of the access point (step 312), any stored event data is downloaded from the storage area 35 to the evaluation server 50 (step 314). As indicated in FIG. 9, stored event data 150 is transmitted via a direct wireless link to an access point 250, using wireless communication module 206. The direct wireless link may be an infrared link, a Bluetooth link, an IEEE 802.11, or the like. The data 150 is then transmitted from the access point 250 to an evaluation server 50 via wireless network 260. Network 260 may be any type of wireless network, such as a wireless wide area network ("WWAN"), a wireless local area network ("WLAN"), or an IEEE 802 wireless network such as an IEEE 802.11 ("WiFi") network.

The step of monitoring for vehicle proximity to an access point in an exemplary embodiment comprises tracking the vehicle's geographic location using GPS sensor 205 (FIG. 3), which may be integrated with the event detector system or unit or may be an existing vehicle GPS sensor, and comparing the geographic location with known access point locations. The access point locations may be provided on a map which may be stored in storage area 35 or in the on-board vehicle computer. The central processing unit will compare current GPS location with stored access point locations to determine when the vehicle comes within range of an access point. Use of the GPS sensor to determine whether the vehicle is in proximity with an access point will conserve power, since it does not require periodic wireless queries to be sent to locate access points. Alternatively, the event detector may simply listen for a pilot signal from an access point.

This method allows the event detector to conserve memory space more effectively, since any stored event data is automatically transmitted to the evaluation server and deleted from storage area 35 whenever the vehicle is within range of a wireless network access point. Of course, if there is currently no event data saved in storage area 35, there is no need to track vehicle location for data transmission purposes.

It will be understood that the various illustrative logical blocks, modules, and methods described in connection with the embodiments disclosed herein can be implemented or performed with a general purpose processor, a digital signal processor ("DSP"), application specific integrated circuits ("ASICs"), or field programmable gate arrays ("FPGAs") or other programmable logic device, discrete gate or transistor logic, discrete hardware components, or any combination thereof designed to perform the functions described herein. A general-purpose processor such as event detector or central processing unit 30 can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

The central processing unit or event detector 30 has a main memory and may also include a secondary memory (not illustrated). The data storage area 35 of FIG. 3 may be provided in the main memory or a secondary memory. The main memory provides storage of instructions and data for programs executing on the processing unit 30. The main memory is typically semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM"). The secondary memory may optionally include a hard disk drive and/or a removable storage drive, for example a floppy disk drive, a magnetic tape drive, a compact disc ("CD") drive, a digital versatile disc ("DVD") drive, etc. The removable storage drive reads from and/or writes to a removable storage medium in a well-known manner. The removable storage medium may be, for example, a floppy disk, magnetic tape, CD, DVD, etc. The removable storage medium may be a computer readable medium having stored thereon computer executable code (i.e., software) and/or data.

In alternative embodiments, secondary memory may include other similar means for allowing computer programs or other data or instructions to be loaded into the computer system. Such means may include, for example, an external storage medium and an interface (not illustrated). Examples of external storage medium may include an external hard disk drive or an external optical drive, or and external magneto-optical drive. Other examples of secondary memory may include semiconductor-based memory such as programmable read-only memory ("PROM"), erasable programmable read-only memory ("EPROM"), electrically erasable read-only memory ("EEPROM"), or flash memory (block oriented memory similar to EEPROM). Also included are any other removable storage units and interfaces, which allow software and data to be transferred from the removable storage unit to the central processing unit 30.

Computer executable code (i.e., computer programs or software) is stored in the main memory and/or a secondary memory. Computer programs can also be received via communication module 205 and stored in the main memory and/or the secondary memory. Such computer programs, when executed, enable the computer system to perform the various functions of the present invention as previously described.

In this description, the term "computer readable medium" is used to refer to any media used to provide computer executable code (e.g., software and computer programs) to the computer system. Examples of these media include main memory, secondary memory (including hard disk drive, removable storage medium, and external storage medium), and any peripheral device communicatively coupled with communication module 205 (including a network information server or other network device). These computer readable mediums are means for providing executable code, programming instructions, and software to the central processing unit.

In an embodiment that is implemented using software, the software may be stored on a computer readable medium and loaded into computer system by way of removable storage drive, interface, or communication interface. In such an embodiment, the software is loaded into the computer system in the form of electrical communication signals. The software, when executed by the processor 30, preferably causes the processor 30 to perform the inventive features and functions previously described herein.

Those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

The invention claimed is:

1. A method of transferring stored event data from an event detector in a vehicle to a remote evaluation server, comprising the steps of:
capturing driving events at an event detector in a vehicle and storing the captured driving events in a data storage area;
monitoring the output of at least a first sensor in the vehicle;
detecting an access point and sending the stored driving event data to said-access point over a wireless link, said detecting and sending responsive to a data transfer condition being detected;
searching for an access point in response to detection of at least said predetermined output from said first sensor, the data transfer condition comprising a combination of said predetermined output emanating from at least said first sensor and detection of the proximity of the vehicle to said access point; and
transferring the data from said access point to an evaluation server only when said predetermined sensor output is detected and the vehicle is in sufficient proximity with said access point to support wireless communications between said event detector and said access point;
said data transfer condition comprising at least detection of a predetermined output from said first sensor.

2. The method as claimed in claim 1, wherein said monitoring step comprises monitoring of the outputs of a plurality of sensors and said data transfer condition comprises a combination of predetermined outputs from a plurality of said sensors and the detection of proximity of the vehicle wit the access point, and said searching step occurs in response to detection of predetermined outputs from one or more of said plurality of sensors.

3. The method as claimed in claim 1, wherein the step of searching for an access point comprises attempting to contact an access point at predetermined time intervals.

4. The method as claimed in claim 3, wherein the duration of said time intervals are determined by a backoff algorithm which is reset when at least said predetermined output from said first sensor is detected, the backoff algorithm having a time interval which increases after at least one failed attempt to find an access point.

5. The method as claimed in claim 4, wherein the time interval increases after one failed attempt to find an access point.

6. The method as claimed in claim 4, wherein the time interval increases after n failed attempts to find an access point, where n is greater than one.

7. The method as claimed in claim 1, wherein said access point is a docking station of a fleet yard.

8. The method as claimed in claim 1, wherein said predetermined sensor output comprises a predetermined value that is a non-zero threshold value.

9. The method as claimed in claim 8, wherein said sensor is a motion sensor, and said predetermined sensor output comprises a signal indicating that the vehicle's motion has ceased.

10. The method as claimed in claim 9, wherein said motion sensor is an accelerometer.

11. The method as claimed in claim 10, wherein the predetermined threshold value is approximately 0.08 G, where G is the acceleration of gravity, and an output of 0.08 G or less indicates that the vehicle's motion has ceased.

12. The method as claimed in claim 1, wherein the step of transferring the driving event data from said access point to an evaluation server comprises transferring the data over a wired network.

13. The method as claimed in claim 1, wherein the step of transferring the driving event data from said access point to an evaluation server comprises transferring the data over a wireless network.

14. The method as claimed in claim 1 wherein said step of transferring the driving event data from said access point to an evaluation server comprises transferring the data over a combined wired and wireless network.

15. The method as claimed in claim 1, further comprising a step of deleting stored event data from a local storage area of the event detector when the data has been transmitted from the local storage area to the evaluation server.

16. The method as claimed in claim 1, wherein said step of monitoring the output of at least one sensor in the vehicle comprises monitoring the output of at least one position sensor in the vehicle to determine when the vehicle is within the range of an access point of a wireless communication network, whereby stored data is downloaded to said access point whenever the vehicle is in proximity with an access point.

17. The method as claimed in claim 16, wherein said step of monitoring the output of a position sensor comprises monitoring the output of a global positioning system ("GPS") sensor.

18. The method as claimed in claim 1, further comprising the steps of confirming when stored driving event data has been successfully sent to the access point, and deleting the stored driving event data from the event detector upon said event detector receiving continuation that the data has been successfully sent to the access point.

19. A system for wireless transfer of driving event data, comprising:
an event detector in a vehicle for capturing and storing driving event data;
at least one sensor in the vehicle for detecting a vehicle parameter;
an evaluation server remote from the vehicle;
a transmitter connected to the event detector for transmitting the stored driving event data to the evaluation server over a wireless communication network;
the event detector comprising a processor for monitoring the output of said sensor for a predetermined value of said vehicle parameter and for controlling the transmitter to transmit stored driving event data responsive to a predetermined data transfer condition of said event detector, the data transfer condition comprising at least detection of said predetermined value of said sensor output;
wherein said sensor is an acceleration sensor and said predetermined value comprises a threshold value which corresponds to the vehicle being substantially stopped.

20. The system as claimed in claim 19 wherein the predetermined threshold value is approximately 0.08 G, where G is the acceleration of gravity.

21. The system as claimed in claim 19, wherein the processor is configured to search for a docking station in proximity to the vehicle whenever said predetermined threshold value of at least said one sensor output is detected, said predetermined data transfer condition comprising detection of at least said predetermined threshold value in combination with detection of sufficient proximity of the vehicle to a docking station to support wireless data transfer therebetween.

22. The system as claimed in claim 21, wherein said processor is configured to attempt to contact a docking station at predetermined backoff time intervals after detection of at least said predetermined threshold value.

23. The system as claimed in claim 22, wherein said processor is configured with a backoff algorithm which increases the backoff time interval subsequent to least one failed attempt to contact a docking station.

24. The method as claimed in claim 23, wherein said backoff time interval increases after one failed attempt to find an access point.

25. The method as claimed in claim 23, wherein said backoff time interval increases after n failed attempts to find an access point, where n is greater than one.

26. The system as claimed in claim 21, wherein said at least one sensor comprises a plurality of sensors in the vehicle for detecting one or more vehicle parameters, and said processor is configured to search for a docking station in sufficient proximity to the vehicle to support wireless data transfer between said transmitter and said access point whenever the output values of the sensors are each above a predetermined threshold value for each sensor.

27. The system as claimed in claim 21, wherein said processor is configured to delete the stored driving event data on confirmation of transmission of the stored driving event data to a docking station.

28. The system as claimed in claim 19, wherein one said sensor comprises a global positioning system ("GPS") sensor and said processor comprises means for monitoring the GPS sensor output for location of the vehicle within transmission range of any access point of a wireless network, whereby said transmitter transmits all currently stored event data over the wireless network to the evaluation server when the vehicle is within transmission range of an access point.

* * * * *